US008028113B2

(12) United States Patent
Fuente et al.

(10) Patent No.: US 8,028,113 B2
(45) Date of Patent: Sep. 27, 2011

(54) METHODS AND SYSTEMS FOR DEADLOCK-FREE ALLOCATION OF MEMORY

(75) Inventors: Carlos F. Fuente, Southhampton (GB); William J. Scales, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 12/192,645

(22) Filed: Aug. 15, 2008

(65) Prior Publication Data

US 2010/0042755 A1 Feb. 18, 2010

(51) Int. Cl.
*G06F 12/02* (2006.01)
(52) U.S. Cl. .......................... 710/200; 711/147; 710/22
(58) Field of Classification Search ........................ None
See application file for complete search history.

(56) References Cited

U.S. PATENT DOCUMENTS

| 4,660,130 | A  | * | 4/1987  | Bartley et al. ................. 711/209 |
| 6,085,296 | A  | * | 7/2000  | Karkhanis et al. ............. 711/147 |
| 6,804,766 | B1 | * | 10/2004 | Noel et al. ..................... 711/203 |
| 7,099,999 | B2 | * | 8/2006  | Luick ............................. 711/137 |
| 7,243,088 | B2 | * | 7/2007  | Verma et al. ................... 707/695 |
| 7,334,076 | B2 |   | 2/2008  | Hendel et al. |
| 7,418,439 | B2 | * | 8/2008  | Wong ..................................... 1/1 |
| 2008/0155168 | A1 | * | 6/2008  | Sheu et al. ......................... 711/6 |
| 2008/0215768 | A1 | * | 9/2008  | Reid et al. ......................... 710/22 |
| 2008/0294853 | A1 | * | 11/2008 | Kowlali et al. ................ 711/154 |

OTHER PUBLICATIONS

J.S. Glider, et al.; "The Software Architecture of a SAN Storage Control System"; IBM Systems Journal, vol. 42, No. 2, 2003; pp. 232-249.

* cited by examiner

*Primary Examiner* — Cheng-Yuan Tseng
(74) *Attorney, Agent, or Firm* — Randall J. Bluestone; Roberts Mlotkowski Safran & Cole, P.C.

(57) ABSTRACT

Methods and systems for memory management. A method for memory management includes: maintaining a reference count for at least one first process associated with a portion of memory; maintaining a shared reference count for at least one second process associated with the portion of memory; and freeing the portion of memory when the shared reference count is decremented to zero.

19 Claims, 6 Drawing Sheets

METHODS AND SYSTEMS FOR DEADLOCK-FREE ALLOCATION OF MEMORY

FIELD OF THE INVENTION

The invention generally relates to memory management, and more particularly to methods and systems for efficient and deadlock free allocation of memory resources in a storage controller subsystem.

BACKGROUND

Within many data systems the management of buffer space (e.g., physical memory that is set aside to be used within data transfer processes) is a significant concern, and especially within storage controllers. Memory is required to handle any disk operation, such as performing a write from a host server to a disk in which: a buffer is allocated from storage controller memory; data is transferred from host to the allocated buffer by a direct memory access (DMA) engine; on completion of this first data transfer, a further DMA operation transfers the data thus obtained from the same buffer to the disk; and on completion of the second data transfer operation, the buffer can be freed.

More complex operations are possible in support of enhanced functions. For instance, mirroring involves the same data being transferred to two (or more) disks. A known technique is to allocate a second buffer and then copy the data that needs to be transferred to this second buffer. As each of the two data transfer operations to the disks completes, each frees an independent buffer. However, this scheme has the significant disadvantage that the operation to copy the buffer is expensive, in terms of both memory and bandwidth.

It is possible to perform these disk writes by referring directly to the same buffer. However, each disk-write operation can be subject to a large number of transformations, such as caching, FlashCopy, SnapShot, lookup through a directory, etc. As such, it can become a constraint on the system design complexity to keep track of both limbs of the write operation and identifying when it might be complete.

Other known techniques involve page-reference-counting and copy-on-write. These combine the benefits in terms of flexibility of an independent buffer for each operation, while keeping the operational efficiency of avoiding copying data simply to generate an identical image. These schemes typically include: a unit of memory called a page; a data structure containing an entry for each page (e.g., a page table), where the entry associated with a page contains a reference count; and page references that are given to owners of one of the references to a page and with which a data transfer operation can be performed.

For example, pages are initialized with reference counts all set to zero. Unallocated pages are typically kept on a linked-list of free pages. When a new I/O operation (e.g., a host-write) requires allocation of a page, a page is chosen and its reference count is set to one. A page reference is returned which is used to setup the data transfer to the host.

In order to perform the two disk-writes of a mirrored-write, a copy operation is performed by incrementing the reference count (which becomes two), and creating a new page reference, referring to the same page. The two page references are now each used as part of a disk-write operation to perform the data transfer operation and send data to the disks. As each data transfer completes, each operation frees its page reference, which is performed by decrementing the page reference count. For example, when the first I/O process is complete, the page reference count is decremented by one, from two to one. Then, when the second I/O process ends, the reference count is decremented again, this time to zero. At this point, there are no more references to the page, such that the page can be freed (e.g., returned to the set of free pages).

The page-reference-count technique works well for a mirrored-write operation because, after the initial store of data from the host to the page (e.g., memory), the I/O operations only transfer data out of the page. That is, the mirrored-write only writes to disk(s), and so only needs to read the page (e.g., memory) without writing to the page. As such, the two I/O operations of the mirrored-write can perform their data transfer operations in parallel without risk of disrupting each other's operation.

However, it is often the case that one of the I/O processes accessing memory alters a portion of the memory. For example, a disk-read operation may change the contents of a page. In cases where multiple processes are accessing the same page, it is desirable that a change to the page caused by one process (e.g., a disk-read) not affect another process (e.g., a disk-write referring to the same page). Put another way, each process referring to a page should retain the illusion of having its own independent copy of the memory. The copy-on-write technique accomplishes this goal. According to the copy-on-write technique, a process that seeks to change the page will: allocate a new page from the set of free pages; copy the contents of the currently held page (as recorded in the page reference) to the new page; set the reference count of the new page to one; decrement the reference count in the old page; update the page reference to refer to the new page, rather than the old one; and then proceed to update the contents of the new page, leaving the old page intact.

Using this technique, the updates are only performed to a new page which is not initially shared with any other processes, such that the updates can be performed without risk of impacting those processes that share the old page. Copy-on-write is commonly used in a number of fields, including managing memory as well as disk space.

A reference counted page has a further benefit that it can save memory. For example, the function of two pages of memory can be served by just one physical page. This benefit is often used within virtual memory managers within operating systems to save memory. When an update becomes necessary, a copy-on-write is performed and some of the memory savings are lost. However, this is infrequent enough that the overall memory savings remain significant, and the copy-on-write penalty can be handled by other virtual memory allocation techniques. For instance, when physical memory is scarce, an operating system may cause a process to be paged out to disk (e.g., virtual memory). This frees up physical memory to another process that requires it, either for new pages of memory or to satisfy a copy-on-write operation.

Within storage controllers however, virtual memory techniques are less useful because they can lead to deadlock. Deadlock can occur, for example, when a storage controller runs out of memory mid-way through an I/O process. This can lead to the process being aborted, serialization of processes, etc. Unlike an operating system, a storage controller generally cannot utilize the same technique of paging out to disk if it should run out of memory, since that would multiply the amount of disk operations and add unacceptably to the system cost of performing disk operations when under heavy load. Therefore, within storage controller systems, conventional practice is to use the same amount of memory in a reference counted scenario as if the memory had not been reference counted.

For example, in the scenario where a single page is referred to by two operations, there is a second page that holds no data that is retained in the system. This second page is used in the event that either of the two operations needs to perform an update, and hence a copy-on-write operation. In that case, the second page is assigned to that process, and data copied into it, without needing to first allocate a page and consider the possibility that one is not available. Conceptually, these pages are kept in a separate store to cover the reference counted copies. In practice these pages need not be physically allocated; instead, a counter of such pages can be kept and used to constrain allocations from the free pool. The counters describe a portion of the unused memory that is not really free, merely being held in reserve should there be a need to perform copy-on-write.

As is commonly understood in the art, a page is a unit of allocation of memory, and is often 4k in size. It is often the case that disk operations work to smaller units, such as 512 byte sectors, eight to a page. It is possible to have plural I/O operations acting on separate sectors of a page. For example, a host-read operation may transfer from memory to the host from sectors 2 and 3, a disk-write operation may transfer from memory to the disk from the sectors 4 and 5, and a disk-read operation may transfer to controller memory from the disk for all the remaining sectors (e.g., sectors 0, 1, 6, and 7). The storage controller tracks which processes are operating on each page by using data structures, such as buffer descriptors and a page table having a reference count of processes associated with each page.

In this example, however, the disk-read operation can be problematic because it is not sufficient to transfer directly to the page, since that might corrupt the more up-to-date data being sent to disk as part of the other disk-write or host-read operations. Instead, the disk-read is performed by: reading into a separate page; merging the appropriate sub-contents of the previously existing cache page into the new page holding the other portions of the data; swapping the new page for the old page; and freeing the old page reference. This results in decrementing the page reference count, and if the reference count then reaches zero, freeing the old page and returning it to the pool. This is an update of the page from the point of view of the disk-write or host-read operations.

There are a number of algorithms of handling these operations to maintain correctness. For example, all of the operations could be serialized, which is straightforward but would significantly impact the performance of the system. The latency of such operations is a significant concern to host servers, and performing operations in parallel is generally desirable. Alternatively, each operation could perform its own copy of the page, and thus be assured that they have their own reference count. They would each therefore be able to proceed in parallel, and be protected from the disk read operation. However, as stated earlier, to ensure deadlock-free operation, each still needs to allocate a page, in case a copy-on-write became necessary. Running many such operations in parallel increases the amount of memory consumed even though the need to perform copy-on-write is rare. Another alternative way of attacking the problem would be to use a finer granularity of unit for tracking allocations. This would reduce the number of cases where multiple processes contend for the shared resource, as in the example given above. However, such a scheme would have a heavy burden in terms of the detailed data structures required at this level of tracking.

Accordingly, there exists a need in the art to overcome the deficiencies and limitations described hereinabove.

SUMMARY

In a first aspect of the invention, there is a method for memory management, comprising: maintaining a reference count for at least one first process associated with a portion of memory; maintaining a shared reference count for at least one second process associated with the portion of memory; and freeing the portion of memory when the shared reference count is decremented to zero and the reference count equals zero.

In another aspect of the invention, there is a system for allocating memory resources. The system includes a storage controller including hardware and software arranged to: designate I/O processes as one of updating processes and non-updating processes; maintain a reference count of the updating processes and a shared reference count of the non-updating processes associated with a page of memory; and delay freeing the page until the shared reference count equals zero.

In another aspect of the invention, there is a computer program product comprising a tangible computer-usable medium having a computer readable program embodied in the medium. The computer readable program, when executed on a storage controller, causes the storage controller to: receive a first function call associated with a first process; designate the first process as a non-updating process; allocate to the first process a first page reference to a first page of memory; receive a second function call associated with a second process; designate the second process as an updating process; copy contents of the first page to a second page; merge sectors of the first page to the second page after the second process has altered sectors of the second page; and delay freeing the first page until the first process terminates.

In another aspect of the invention, there is a method for managing memory. The method includes providing a direct memory access storage controller that operates to: designate I/O processes associated with a page of memory as one of updating and non-updating; update a reference count representing a number of updating processes associated with the page; update a shared reference count representing a total number of non-updating processes associated with the page; and free the page for use by other code when the shared reference count decrements to zero. The storage controller comprises a combination of hardware and software.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention generally relates to memory management, and more particularly to methods and systems for efficient and deadlock free allocation of memory resources in a storage controller subsystem. In embodiments, a shared reference count is added to the page table of a page, and processes that refer to the page are identified as either updating or non-updating. The shared reference count indicates the number of non-updating processes that refer to a page without having their own allocation of the page. As each non-updating process completes it's I/O operation (e.g., stops using the page), the shared reference count is decremented. According to aspects of the invention, a storage controller delays freeing a merged page until the shared reference count decrements to zero. In this manner, implementations of the invention avoid data corruption of non-updating processes by ensuring that a page is not freed until it is no longer being used by any non-updating process.

Figure 1:
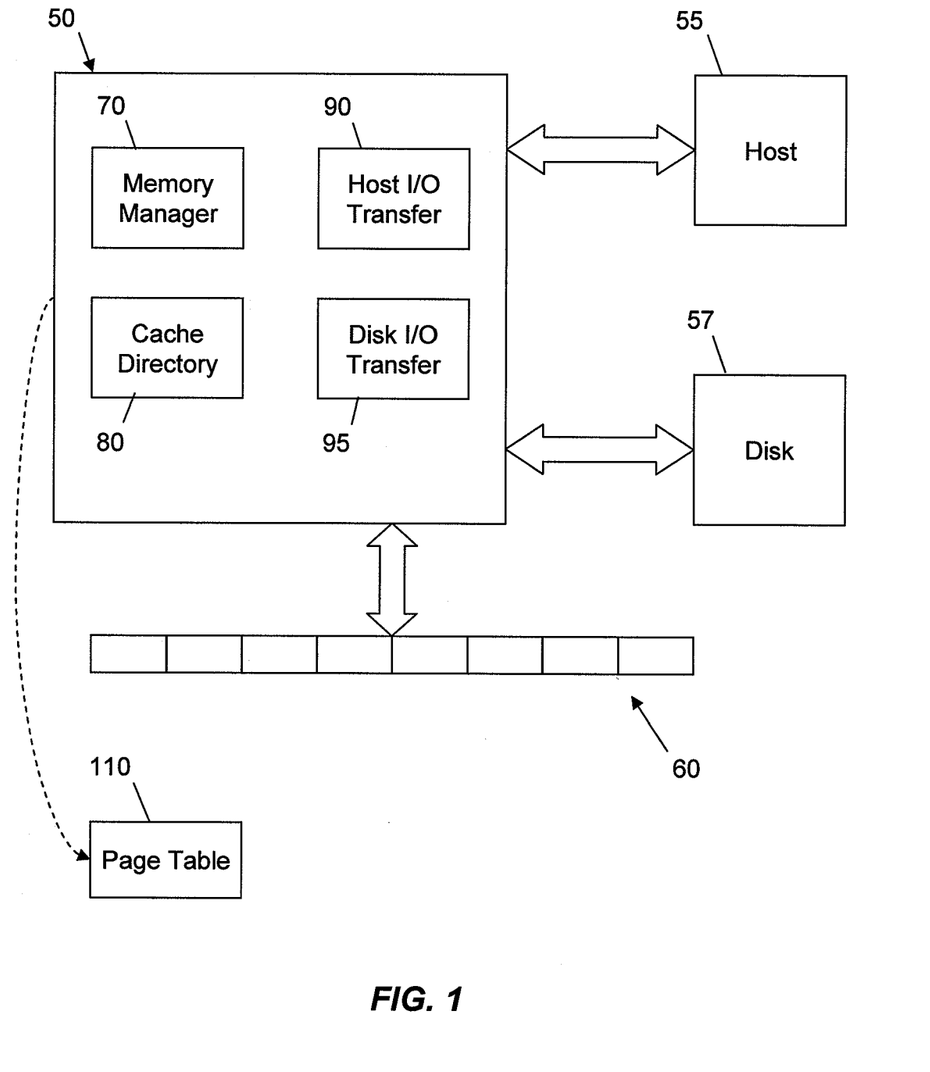
FIG. 1 shows a diagrammatic depiction of an exemplary system according to aspects of the invention.

FIG. 1 shows a diagrammatic depiction of an exemplary system according to aspects of the invention. The system comprises a storage controller 50 that controls and manages data transfer to and from a host 55, and to and from a disk 57, by controlling and managing access to physical memory 60. The physical memory 60 may be divided into buffers, each of which is 32k bytes of memory. Moreover, each buffer may be divided into 8 pages, each page being 4k bytes. Even further, each page may be divided into eight sectors, e.g., sectors 0-7, with each sector being 512 bytes.

In embodiments, the storage controller 50 comprises components that maintain data structures and descriptors for managing access to the physical memory 60. For example, the storage controller 50 may include a memory manager 70 that maintains a page table 110. Also, the storage controller 50 may comprise a cache directory component 80 that maintains a set of buffer descriptors. The storage controller 50 may also comprise, among other things, a host I/O transfer component 90 for performing host-read operations between the physical memory 60 and the host 55, and a disk I/O transfer component 95 for performing disk-write and disk-read operations between the physical memory 60 and the disk 57.

According to aspects of the invention, the storage controller 50 may be implemented in any suitable combination of hardware and software. For example, the storage controller 50 may be similar to a central processing unit (CPU), having appropriate programming to perform the processes described herein. Moreover, the storage controller 50 may include non-volatile memory and hardware interfaces for interfacing with the host 55 and disk 57.

In embodiments, the storage controller 50 maintains data structures to manage I/O processes involving the memory 60. The data structures may comprise some aspects of conventional data structures, such as, for example, buffer descriptors and page tables. More specifically, according to aspects of the invention, the storage controller 50 designates each I/O process associated with a page as an updating process or a non-updating process. An updating process is an I/O process that may write data to the page, such as, for example, a disk-read. A non-updating process is an I/O process that only reads data from the page, such as, for example, a disk-write or a host-read. The manner of designating processes as updating process or a non-updating process may be pre-determined, such as, for example, in the programming of the storage controller 50 and/or in the function call of respective processes. The storage controller 50 may store that designation of each process in a data structure.

Additionally, the storage controller 50 maintains a page table 110 that, for each page of memory 60, maintains a reference count of updating processes associated with a particular page. The page table 110 also includes a shared reference count of non-updating processes associated with the same page. In embodiments, the page table 110 is a data structure stored in the storage controller 50, and the storage controller 50 updates the reference count and shared reference count for each page as I/O processes are allocated to a particular page. For example, when a new non-updating process is allocated to the page, the storage controller 50 increments the shared reference count of the page (e.g., increases the shared reference count by a value of one). When an existing non-updating process terminates (e.g., finishes using the page), the storage controller 50 decrements the shared reference count of the page (e.g., decreases the shared reference count by a value of one). In this manner, the shared reference count represents a running total of the number of non-updating processes that are accessing a particular page. The storage controller 50 maintains the reference count in a similar manner, the reference count representing the number of updating processes associated with a physical page of memory.

In accordance with aspects of the invention, by maintaining the shared reference count of non-updating processes that are referencing a page, the storage controller 50 operates to defer (e.g., delay) freeing of a page (e.g., after a merge) until after all of the non-updating processes are finished using the page. For example, after a merge, a conventional memory controller would free the original page for use by other code (e.g., other processes), without regard to whether it is being used by any other processes. However, in embodiments of the invention, the storage controller 50 does not free the original page until the shared reference count of the original page is zero, thus indicating that no non-updating processes are utilizing the page. In this manner, data corruption of the non-updating processes is avoided during multiple concurrent operations involving the same page of memory.

Figure 2A:
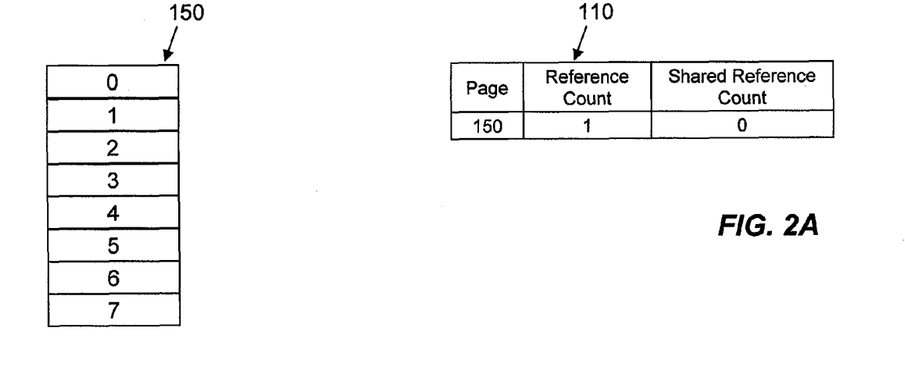
FIGS. 2A-2G show an exemplary sequence of operations according to aspects of the invention.

FIGS. 2A-2G depict an example of operation according to aspects of the invention. In FIG. 2A, a page 150 of memory has eight sectors (e.g., 0-7). A cache component (not shown) of the storage controller 50 owns the page allocation, and holds four sectors (e.g., sectors 2, 3, 4, 5). As seen in the page table 110, the reference count for the page is one, and the shared reference count for the page is zero.

Figure 2B:
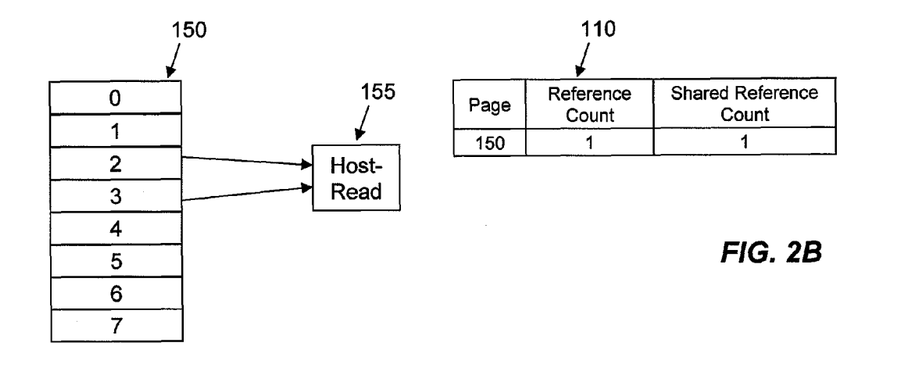

At FIG. 2B, at host-read operation 155 is called, and is allocated a shared reference to the page 150 in a conventional manner. In this example, the host-read operation 155 reads data from sectors 2 and 3 of the page 150. According to aspects of the invention, the host-read operation 155 is pre-defined, either in the storage controller 50 or the function call, as a non-updating process. Accordingly, the shared reference count is incremented to one, and a shared page reference is passed to be used by the host-read operation 155 to setup the data transfer to the host.

Figure 2C:
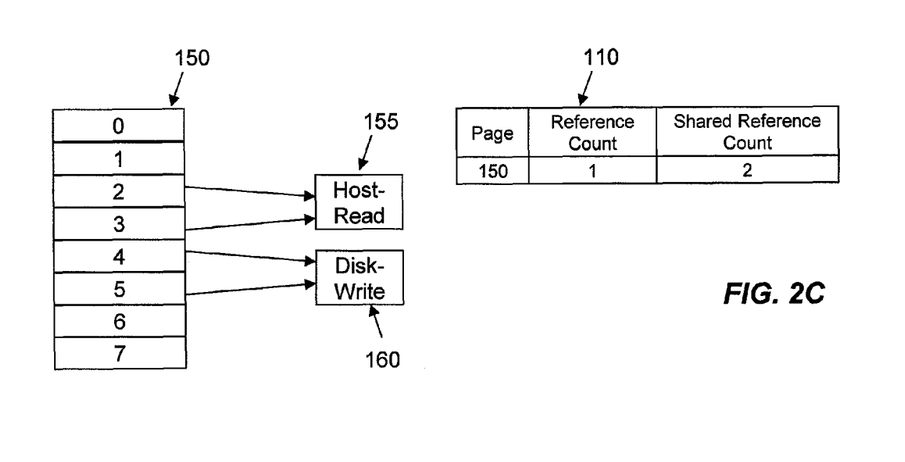

At FIG. 2C, a disk-write operation 160 is called, and is allocated a shared reference to the page 150 in a conventional manner. In this example, the disk-write operation 160 reads data from sectors 4 and 5 of the page 150. According to aspects of the invention, the disk-write operation 160 is pre-defined, either in the storage controller 50 or the function call, as a non-updating process. Accordingly, the shared reference count is incremented to two, and a shared page reference is passed to be used by the host read operation to setup the data transfer to the disk.

Although only two non-updating processes are shown (e.g., host-read operation 155 and disk-write operation 160), any number of non-updating processes can be set up in parallel. For each new non-updating process, the storage controller 50 updates the shared reference count. None of the non-updating processes require a new page to be allocated, since each is only reading data from the page.

Figure 2D:
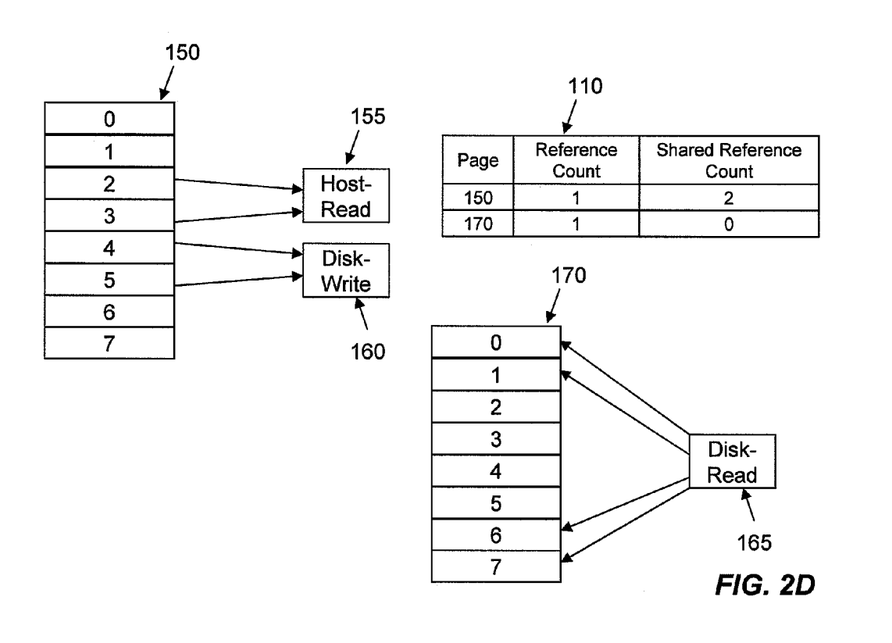

FIG. 2D depicts where a disk-read operation 165 is called with regard to sectors 0, 1, 6, and 7 of page 150. According to aspects of the invention, the disk-read operation 165 is pre-defined as an updating process, either in the storage controller 50 or the function call. Since the disk-read operation 165 is an updating process, the storage controller 50 allocates it with a new page 170 and a new page reference. The new page 170 is an independent page of physical memory and is initially a copy at least sectors 0, 1, 6, and 7 of the original page 150. As shown in the page table 110, the reference count for the new page 170 is one, and the shared reference count for the new page is zero. The disk-read operation 165 writes data to sectors 0, 1, 6, and 7 of new page 170.

Figure 2E:
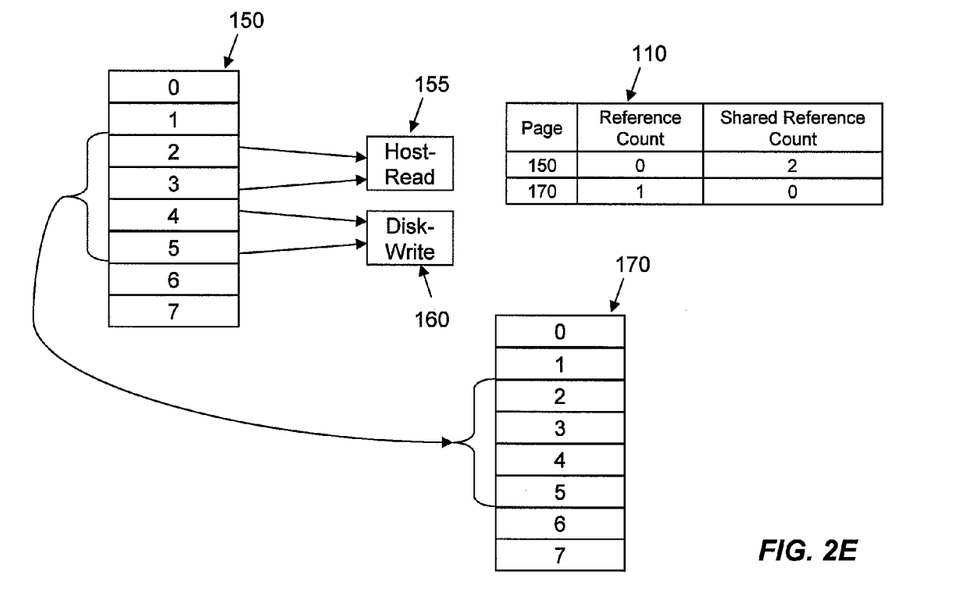

As shown in FIG. 2E, when the disk-read operation 165 is complete, the storage controller 50 issues the merge operation into the page 150, to fill out the sectors 0-1 and 6-7. Because the shared reference count on the page 150 is non-zero, the merge operation is performed by copying the data from the existing page-in-cache (e.g., sectors 2-5 of page 150) to sectors 2-5 of the new page 170, and then placing the new fully populated page 170 into cache, leaving the existing page 15Q still in use by the other processes. The reference count of page 150 is decremented due to the merge operation.

At this point, there are two pages (e.g., 150 and 170) in the system. Page 170 is in the cache, and page 150 is being used by the two non-updating processes. In conventional systems, since the reference count for page 150 is zero, the page 150 would be freed at this point for use by other code, leaving page 170 remaining. However, according to aspects of the invention, because the shared reference count of page 150 is non-zero, the page 150 is retained in use and is not freed for use by other code.

Figure 2F:
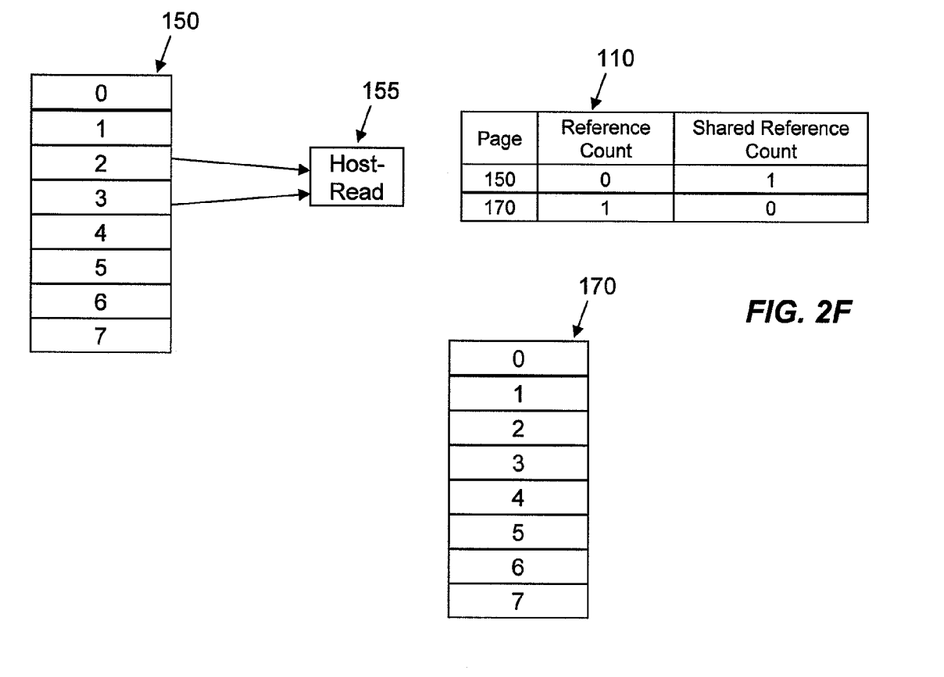
Figure 2G:
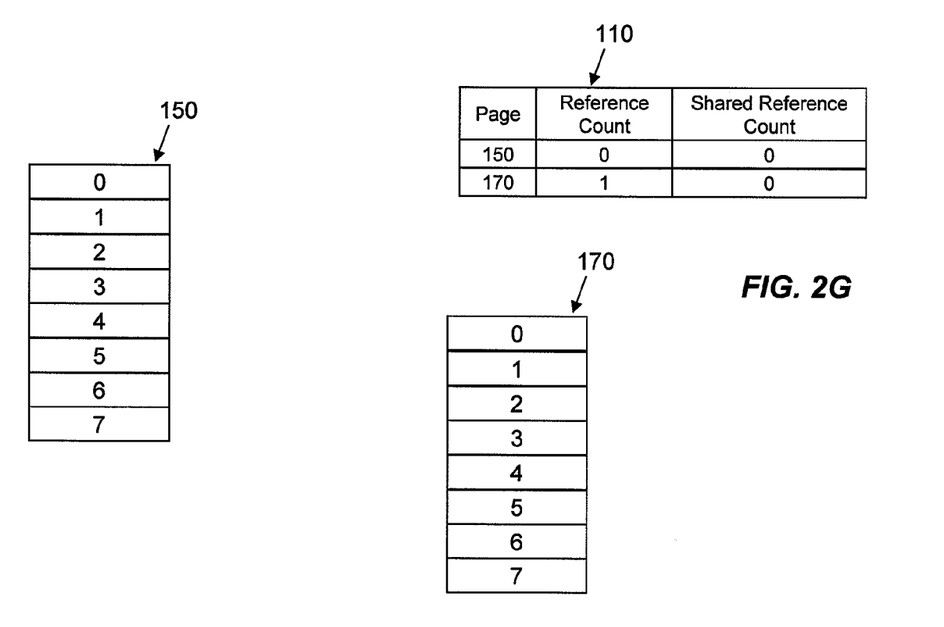

FIG. 2F depicts where the disk-write operation 160 completes (e.g., terminates). Accordingly, the storage controller 50 decrements the shared reference count of page 150 by one. FIG. 2G depicts where the host-read operation 155 completes. Accordingly, the storage controller 50 decrements the shared reference count of page 150 by one. At this point, the shared reference count of the page 150 is zero, indicating that the page 150 is not being used by any other non-updating processes. Accordingly, the storage controller 50 frees page 150 for use by other code, and only now becomes available to be used by new IO processes.

Figure 3:
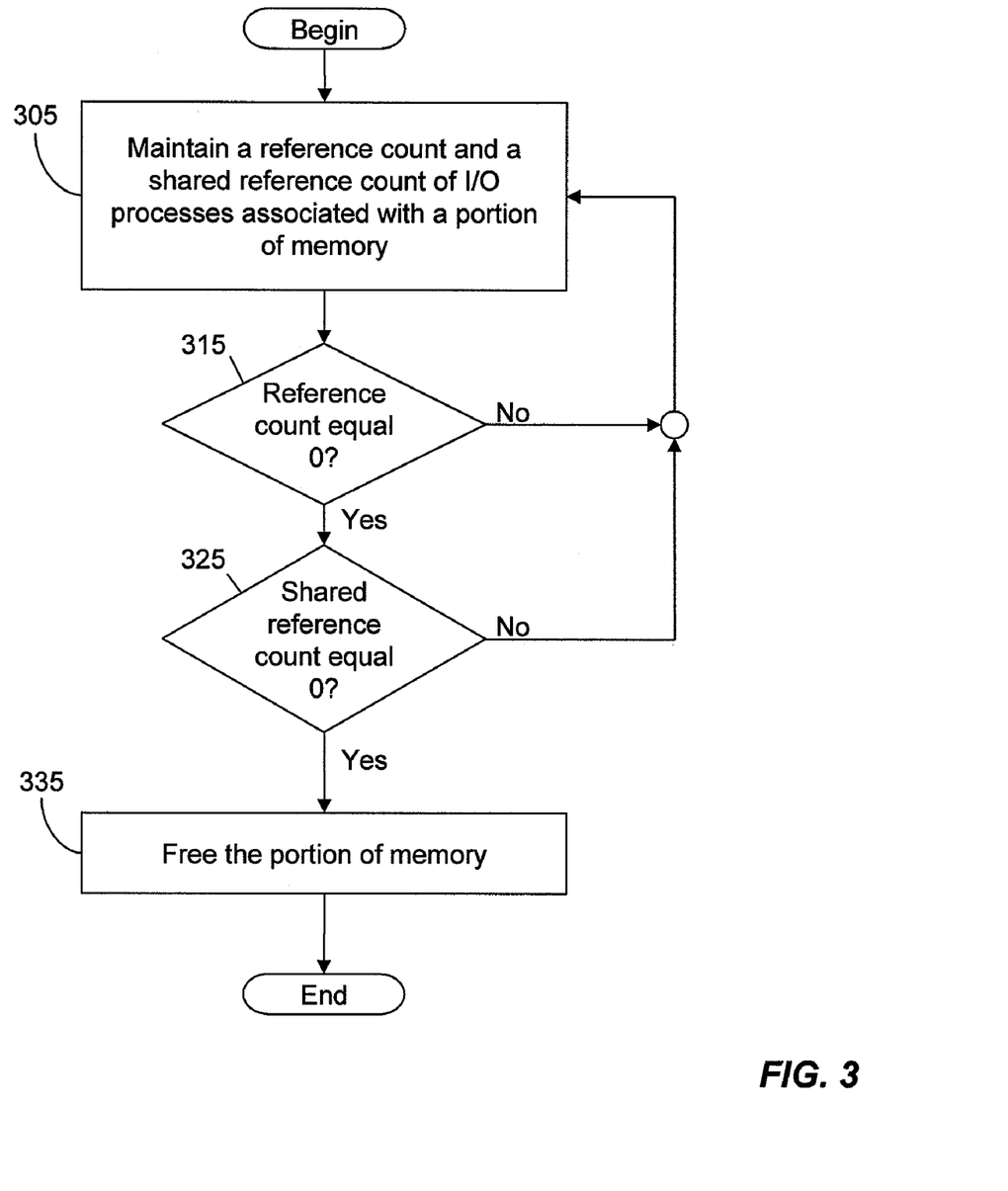
FIGS. 3 and 4 show flow diagrams depicting implementations of methods according to aspects of the invention.
Figure 4:
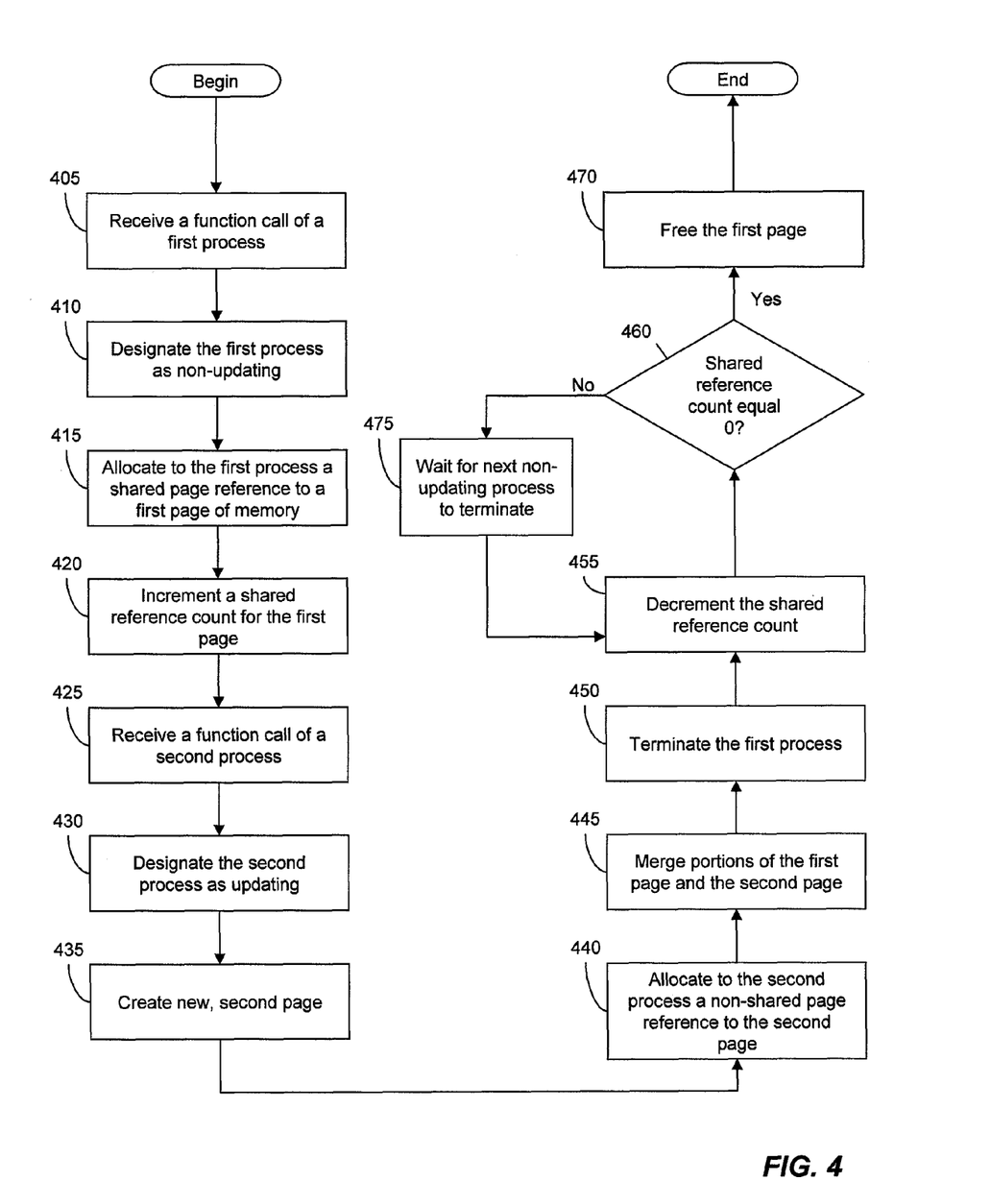

In this manner, implementations of the invention provide a memory management scheme that: avoids physically copying data except where necessary to protect concurrent processes; is deadlock free by maintaining a non-optimistic memory allocation scheme; permits multiple concurrent operations; does not require each operation to have its own memory allocation where no update of the contents of the memory is required; and does not have a heavy cost from a very fine granularity of tracking FIGS. 3 and 4 are flow diagrams depicting steps of methods according to aspects of the invention. The steps of FIGS. 3 and 4 may be implemented in internal logic of a computing system, such as, for example, in internal logic of a storage controller such as that described with respect to FIG. 1. Additionally, the invention can take the form of an entirely hardware embodiment, an entirely software embodiment or an embodiment containing both hardware and software elements. For example, implementations of the invention may be carried out using a computer program product comprising a tangible computer-usable medium having a computer readable program embodied in the medium, wherein the computer readable program when executed on a storage controller causes the storage controller to perform the processes described herein.

FIGS. 3 and 4 may equally represent high-level block diagrams of the invention. The flowchart and/or block diagrams in FIGS. 3 and 4 illustrate the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flowchart, and combinations of the flowchart illustrations can be implemented by special purpose hardware-based systems that perform the specified functions or acts, or combinations of special purpose hardware and computer instructions and/or software, as described above.

Referring to FIG. 3, at step 305, a storage controller maintains a reference count and a shared reference count associated with a portion of memory. The storage controller may be similar to storage controller 50 described above with respect to FIG. 1. The portion of memory may comprise, but is not limited to, a page. In embodiments, the maintaining comprises, but is not limited to: designating I/O processes associated with the page as either updating or non-updating; incrementing the appropriate count when new processes are added; and, decrementing the appropriate count when existing processes terminate (such as, for example, as described above with respect to FIGS. 1 and 2A-2G).

At step 315, the storage controller determines whether the reference count is zero. This may be performed by examining a data structure, such as a page table (e.g., similar to that described above with respect to FIGS. 1 and 2A-2G). If the reference count is not zero, then the method returns to step 305. If the reference count is zero, then the method proceeds to step 325 where the storage controller determines whether the shared reference count is zero. This may be performed by examining the same data structure, e.g., the same page table, as that in step 315. If the shared reference count is not zero, then the method returns to step 305. If the shared reference count is zero, then the storage controller frees the portion of memory for use by other code.

Referring to FIG. 4, at step 405, a storage controller (e.g., storage controller 50) receives a first function call for a first I/O process. At step 410, the storage controller designates the first process as a non-updating process (e.g., a host-read or disk-write). At step 415, the storage controller allocates to the first process a shared page reference to a page of memory. At step 420, the storage controller increments a shared reference count of the page of memory. The shared reference count may be maintained (e.g., by the storage controller) in a page table, in a manner similar to that described above with respect to FIGS. 1 and 2A-2G. The designating and allocating may be performed by a storage controller in a manner similar to that described above with respect to FIGS. 1 and 2A-2G.

At step 425, the storage controller receives a second function call for a second I/O process. At step 430, the storage controller designates the second process as an updating process (e.g., a disk-read). At step 435, the storage controller allocates a new page to the second process, the second page being a copy of the first page. At step 440, the storage controller allocates to the second process a non-shared page reference to the new page. The designating and allocating may be performed by a storage controller in a manner similar to that described above with respect to FIGS. 1 and 2A-2G.

At step 445, after the second process has finished altering the data of the new page, the storage controller merges portions of the original page into the new page. This may be performed in a manner similar to that described above with respect to FIGS. 1 and 2A-2G. At step 450, the first process terminates, e.g., stops accessing the original page. At step

455, upon recognizing the termination of the first process, the storage controller decrements the shared reference count of the first page.

At step 460, the storage controller determines whether the shared reference count of the original page is zero. If the shared reference count is zero, then the storage controller frees the original page for use by other code at step 470. On the other hand, if the shared reference count is not zero, then this is an indication that some other non-updating process is still using the original page. Therefore, the method proceeds to step 475, where the storage controller waits for another non-updating process to terminate, after which the process will return to step 455 to decrement the shared reference count.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed:

1. A method for memory management, comprising:
   allocating to at least one first process a first page reference to a first page of memory;
   allocating to at least one second process a second page reference to a second page of memory;
   copying contents of the first page to the second page;
   merging sectors of the first page to the second page after the at least one second process has altered sectors of the second page;
   maintaining a first reference count for the at least one first process associated with the first page of memory;
   maintaining a first shared reference count for the at least one second process associated with the first page of memory, wherein the first shared reference count represents a number of non-updating processes accessing the first page;
   freeing the first page of memory when the first shared reference count is decremented to zero and the first reference count equals zero;
   incrementing the first shared reference count when a new non-updating process accesses the first page of memory;
   decrementing the first shared reference count when an existing non-updating process terminates; and
   maintaining a second reference count and a second shared reference count associated with the second page of memory, wherein the second shared reference count represents a number of non-updating processes accessing the second page of memory and is initially set to zero.

2. The method of claim 1, wherein the at least one first process comprises an updating process.

3. The method of claim 2, wherein the at least one second process comprises a non-updating process.

4. The method of claim 1, wherein the first and second reference counts and the first and second shared reference counts are maintained by a storage controller.

5. The method of claim 4, wherein:
   each of the first and second portions of memory is a page, and
   the first and second reference counts and the first and second shared reference counts are maintained in a page table.

6. The method of claim 4, further comprising using the first and second portions of memory in direct memory access operations.

7. The method of claim 1, wherein the freeing occurs after a merging operation.

8. A system for allocating memory resources, comprising:
   a storage controller including hardware and software arranged to:
   designate I/O processes as one of updating processes and non-updating processes;
   allocate to the non-updating processes a first page reference to a first page of memory;
   allocate to the updating processes a second page reference to a second page of memory;
   copy contents of the first page to the second page;
   merge sectors of the first page to the second page after the updating processes have altered sectors of the second page;
   maintain a first reference count of the updating processes and a first shared reference count of the non-updating processes associated with the first page of memory;
   delay freeing the first page until the first shared reference count equals zero;
   increment the first shared reference count when a new non-updating process accesses the first page;
   decrement the first shared reference count when an existing non-updating process terminates; and
   maintain a second reference count and a second shared reference count associated with the second page, wherein the second shared reference count represents a number of non-updating processes accessing the second page and is initially set to zero.

9. The system of claim 8, wherein the storage controller comprises non-volatile memory.

10. The system of claim 8, wherein the storage controller comprises at least one hardware interface for connecting to one of a host and a disk.

11. The system of claim 8, wherein the storage controller comprises:
    a memory manager;
    a cache directory;
    a host I/O component; and
    a disk I/O component.

12. The system of claim 8, wherein the second reference count is based upon the updating processes associated with the second page.

13. The system of claim 12, wherein the second shared reference count is based upon the non-updating processes associated with the second page.

14. A computer program product comprising a tangible computer-usable medium having a computer readable program embodied in the medium, wherein the computer readable program when executed on a storage controller causes the storage controller to:
- receive a first function call associated with a first process;
- designate the first process as a non-updating process;
- allocate to the first process a first page reference to a first page of memory;
- receive a second function call associated with a second process;
- designate the second process as an updating process;
- copy contents of the first page to a second page of memory;
- merge sectors of the first page to the second page after the second process has altered sectors of the second page; and
- delay freeing the first page until the first process terminates, wherein the delaying comprises:
- maintaining a first reference count and a first shared reference count associated with the first page, and
- freeing the first page when the first shared reference count equals zero, wherein the first shared reference count represents a number of non-updating processes accessing the first page, and wherein the computer readable program further causes the storage controller to:
- increment the first shared reference count when a new non-updating process accesses the first page,
- decrement the first shared reference count when an existing non-updating process terminates, and
- maintain a second reference count and a second shared reference count associated with the second page, wherein the second shared reference count represents a number of non-updating processes accessing the second page and is initially set to zero.

15. The computer program product of claim 14, wherein the first and second reference counts and the first and second shared reference counts are maintained in a data structure.

16. The computer program product of claim 15, wherein the data structure comprises a page table.

17. A method for managing memory, comprising:
providing a direct memory access storage controller that operates to:
- designate I/O processes associated with a page of memory as one of updating and non-updating;
- allocate to the non-updating processes a first page reference to a first page of memory;
- allocate to the updating processes a second page reference to a second page of memory;
- copy contents of the first page to the second page;
- merge sectors of the first page to the second page after the updating processes have altered sectors of the second page;
- update a first reference count representing a number of updating processes associated with the first page;
- update a first shared reference count representing a total number of non-updating processes associated with the first page;
- free the page for use by other code when the first shared reference count decrements to zero;
- increment the first shared reference count when a new non-updating process accesses the first page; and
- decrement the first shared reference count when an existing non-updating process terminates; and
- maintain a second reference count and a second shared reference count associated with the second page, wherein the second shared reference count represents a number of non-updating processes accessing the second page and is initially set to zero, wherein the storage controller comprises a combination of hardware and software.

18. The computer program product of claim 14, wherein the computer readable program further causes the storage controller to allocate to the second process a second page reference to the second page.

19. The computer program product of claim 14, wherein the computer readable program further causes the storage controller to:
- increment the first reference count when a new updating process accesses the first page; and
- decrement the first reference count when the sectors of the first page and the second page merge.

* * * * *